Patented Feb. 15, 1949

2,461,988

UNITED STATES PATENT OFFICE 2,461,988

HYDROGEN PEROXIDE DISTILLATION AFTER REMOVAL OF ORGANIC PEROXIDES

Pieter Leendert Kooijman, Amsterdam, Netherlands, assignor to Shell Development Company, San Francisco, Calif., a corporation of Delaware No Drawing. Application May 31, 1947, Serial No. 751,633. In the Netherlands August 5, 1941

Section 1, Public Law 690, August 8, 1946
Patent expires August 5, 1961

8 Claims. (Cl. 202—52)

This invention relates to a process for the separation and/or recovery of hydrogen peroxide from liquid mixtures containing it along with substantial quantities of organic peroxides. More specifically, the invention provides a practical and economical process for the separation and/or recovery of hydrogen peroxide from aqueous mixtures containing substantial amounts of hydrogen peroxide along with substantial amounts of organic peroxides, which process comprises treating the mixture to convert substantially all of the organic peroxides to non-peroxidic organic compounds without any substantial destruction of the hydrogen peroxide, and subjecting the treated mixture to distillation to separate the hydrogen peroxide therefrom.

Recently processes have been developed for the production of mixtures containing high concentrations of hydrogen peroxide by the partial combustion of hydrocarbons. For example, U. S. Patent No. 2,376,257 describes and claims a process for the production of hydrogen peroxide and other peroxides by the non-catalytic incomplete oxidation of normally gaseous hydrocarbons by subjecting the vapors thereof to the action of small amounts of oxygen to temperatures of between about 300° C. and about 500° C. for a few seconds. The incomplete oxidation of hydrocarbon vapors is usually followed by an immediate cooling and condensing of the gaseous reaction products, which results in the formation of mixtures which are composed primarily of water, hydrogen peroxide, aldehydes, and traces of free acids and alcohols. It is known that in aqueous solutions containing hydrogen peroxide the aldehydes undergo coupling reactions with hydrogen peroxide to form equilibrium systems in which the equilibria are shifted far to the right toward the production of the organic peroxides, according to the following general equations:

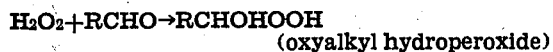
(oxyalkyl hydroperoxide)

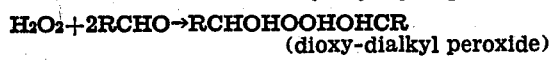
(dioxy-dialkyl peroxide)

In addition, the mixtures also contain small amounts of the acids formed by the reversible decomposition of the organic peroxides, in which reactions the equilibrium again favors the formation of the organic peroxides. While these aqueous solutions containing hydrogen peroxide and organic peroxides are valuable as such for many purposes, they are of particular value as starting materials for a low cost manufacture of hydrogen peroxide in accordance with the process of the invention.

It is known that mixtures containing hydrogen peroxide along with substantial quantities of organic peroxides cannot be safely separated by commonly employed distillation methods, such as distillation under reduced pressure, because the concentration of organic peroxides in the residue results in highly explosive mixtures. It has now been discovered that the organic peroxides in such mixtures may be caused to undergo decomposition reactions more rapidly than hydrogen peroxide, and thus may be selectively converted to substantially non-explosive substances after which the hydrogen peroxide may be safely isolated by ordinary distillation methods. The present invention may therefore be generally stated as relating to a process for the separation of hydrogen peroxide from aqueous mixtures also containing a substantial amount of organic peroxides by treatment of the mixture to convert the organic peroxides to substantially non-peroxidic materials, and the subsequent separation of hydrogen peroxide by fractional distillation of the thus treated material.

The process of the present invention is particularly suitably accomplished by treating the mixture containing hydrogen peroxide and organic peroxides, so as to effect the decomposition of the organic peroxides to acids, which, by virtue of their lower boiling points, may, by distillation, be continuously removed as they are formed, thereby allowing the isolation of hydrogen peroxide without the hazard of explosion and, in addition, reducing the cost of the hydrogen peroxide by forming valuable by-products of the production process. The conversion of the organic peroxides to non-peroxidic compounds may be accomplished in any suitable manner. The organic peroxides may be converted and/or removed in a variety of suitable ways, for example by oxidation, reduction, adsorption, etc., without substantial loss of hydrogen peroxide. In some cases by causing the decomposition products of the organic peroxides to form salts, esters, etc. or otherwise preventing them from recombining to form the peroxides, thereby upsetting the equilibrium of the decomposition reaction, the subsequent conversion of substantially all of the organic peroxides to non-peroxidic compounds may suitably be attained. A particularly suitable method comprises heating the mixtures of peroxides for a period of time sufficient to decompose substantially all of the organic peroxides to the corresponding acids. This heating is preferably effected at a temperature of between about 40° C. and about 120° C. While under certain circumstances it may be desirable to conduct the conversion of the organic peroxides to acids in the presence of various additives to promote a more rapid decomposition of certain of the alkyloxy peroxides, in general the conversion of organic peroxides in accordance with the process of the invention is preferably accomplished by treating the aqueous mixture of peroxide without additives, i. e. with only heat and/or steam. Particularly suitable temperatures for the conversion of the organic peroxides are from about 70° C. to about 110° C. under reaction conditions which allow the separation from the liquid and/or vaporous peroxide-containing mixture of the organic acids as they are formed.

The time required for the conversion of the organic peroxides to non-peroxidic materials will, of course, be dependent upon a number of factors, as the particular mixture of peroxides to be separated, the type and efficiency of the fractionating columns and other apparatus employed, the particular conversion reaction to be employed, the presence or absence of additive substances in the peroxide mixture, the operating pressure and temperature, etc. Particularly satisfactory results have been obtained when operating in a batchwise manner by thermal conversion periods of about one-fourth to about one hour at temperatures between about 60° C. to about 80° C. When operating with the continuous "sweeping out" of the vaporized organic acids by the passage of steam through the reactor and fractionating column at temperatures of slightly above 100° C., particularly suitable conversions have been obtained by maintaining a residence time in the reactor and/or column of from about 2 to about 4 hours. In general, the period of time required for the conversion of the organic peroxides to non-peroxidic compounds must be sufficient to cause the decomposition of substantially all the organic peroxides as indicated by analysis of the mixture. When a thermal decomposition is employed, the period of decomposition must not be extended beyond the time at which the acids formed are oxidized by hydrogen peroxide, as indicated, for example, by the formation of carbon dioxide. Where it is desirable or practical to convert the organic peroxides to non-peroxidic compounds by other methods, or in the presence of additive materials, conversions varying considerably in both time and degree of completion required may be found suitable.

The conversion and/or distillation apparatus may suitably be of any of the types commonly employed for the fractionation of aqueous mixtures and is preferably constructed of or lined with corrosion resistant materials such as glass, ceramics, Monel metal, stainless steel, or the like. When the separation is to be conducted in accordance with the preferred form of the invention whereby the organic peroxides are thermally converted to acids prior to fractionation, either in a batchwise or continuous operation, it is desirable that the apparatus be equipped with means of introducing or returning water to the distillation chamber in order that the peroxide and acid containing solution may be maintained at a concentration of at least about 40% of water, below which concentration the danger of forming an explosive mixture increases rapidly, until substantially all of the organic acids have been removed from the mixture. The concentration of water in the peroxide-acid mixture may be maintained at or much greater than about 40% as is practical or desirable, particularly suitable concentrations being between about 45% and about 85%, until the organic materials have been separated from the aqueous peroxide, after which the peroxide solution may safely be concentrated by any of the commonly employed procedures for forming concentrated aqueous solutions of hydrogen peroxide.

The conversion of organic peroxide material to non-explosive material and/or the separation process of the present invention as a whole may be conducted at any pressure which is rendered practical or desirable by other considerations. Particularly satisfactory results have been obtained at pressures of between about 20 mm. and normal atmospheric pressure when the fractionation distillation was preceded by a thermal decomposition of the organic peroxides to acids. Rapid and efficient separations are obtainable when operating either at sub-atmospheric pressures or at about atmospheric pressure: and particularly efficient conversions and separations are obtained by the use of steam both for heating and as a diluent or "carrier." Either at atmospheric of sub-atmospheric pressure, the water-acid azeotrope formed when operating in accordance with the preferred procedure of the process of the invention may be easily separated from the peroxide containing liquid and/or vapors with very little danger of explosion and further separated into water which may be returned to the distillation chamber thereby producing a concentrated solution of organic acids which form a valuable by-product of the process.

The following examples are given for the purpose of more clearly illustrating the process of the invention, and the invention is in no way to be interpreted as being limited to the particular apparatus and materials recited therein.

*Example I*

An aqueous solution of hydrogen peroxide in the presence of organic peroxides was prepared by condensing the incomplete combustion products formed by the uncatalyzed reaction of propane and oxygen in volumetric ratios of 9:1, in a spherical chamber in which the reacting gases remained substantially free from contact with the chamber walls, and at a temperature of about 465° C. The resulting aqueous solution contained 13.2 grams of active peroxide per liter, of which 30% was organic peroxide and 70% was hydrogen peroxide.

The solution of mixed peroxides was heated for ½ hour at 70° C., during which time the organic peroxides were converted to the corresponding acids. The resulting mixture of hydrogen peroxide, formic and acetic acids was distilled at a pressure of about 40 mm. The vapors from the distillation flask entered a fractionating column which was maintained at approximately 50° C. at the bottom and 35° C. at the top. A mixture of water and acids distilled over into a second column and an aqueous solution of hydrogen peroxide remained. The water and water-acid azeotrope was fed into the second column at approximately the center of the column which contained the equivalent of 20 plates and was maintained at a temperature of approximately 40° C. at the bottom and 35° C. at the tip under a pressure of 40 mm. Water vapor alone distilled over from the top and a concentrated acid-water azeotrope was collected from the bottom of the column. The effluent water vapor was cooled and returned to the distillation chamber so that an acid-free hydrogen peroxide solution of approximately 12% was formed.

*Example II*

An aqueous solution containing 16.8 molar per cent of peroxides, of which 51% is free hydrogen peroxide and 49% is organic peroxides is prepared as described in Example I from the partial combustion of propane. The aqueous solution (1.63 kilograms) is fed into about the middle of a reaction column maintained at a temperature of slightly over 100° C. and having a plate capacity such that the residence time in the column is a few hours during which substantially all of the organic peroxide is decomposed. A large quantity of steam is fed in at the bottom of the column which carries along the acids formed by the decomposition of the organic peroxides with the traces of aldehydes and alcohols which may be present. The vapors are partially condensed at the top of the column so that the hydrogen peroxide is returned, water, aldehydes and alcohol are distilled over, and the water-acid azeotrope is tapped off near the top of the column and passed to the second column. In the second column this azeotrope is concentrated to the formic acid-acetic acid-water azeotrope containing about 80 per cent acid, and water and steam are distilled over, the latter being heated and reintroduced at the bottom of the first column. When the separation is maintained at a final yield of 80 per cent of the hydrogen peroxide and 80 per cent of the organic acids treated, about 65 grams of the 80 per cent formic-acetic acid solution are obtained during the promotion of 520 grams of 30 per cent hydrogen peroxide and in addition, 3720 liters of exhaust gases, composed of formaldehyde, acetaldehyde and water, which may be recovered by well known methods, are liberated from the first reaction column.

While the process of the present invention is particularly suitable for the separation of hydrogen peroxide from the mixtures formed by the partial combustion of hydrocarbons, which are mixtures containing relatively large amounts of hydrogen peroxide, the separation is also applicable to mixtures containing minor amounts of hydrogen peroxide from which it is desirable or practical to remove the hydrogen peroxide as such and the organic peroxides after conversion to non-peroxidic materials. Particularly suitable mixtures for treatment in accordance with the process of the present invention are aqueous solutions containing peroxides which are the additive products of hydrogen peroxide with one or two molecules of aldehydes, i. e. compounds of the general formulas, $R_1CHOHOOH$ and $R_1CHOHOOHOHCR_2$

in which $R_1$ and $R_2$ represent lower alkyl radicals or hydrogen atoms. Illustrative examples of suitable alkyl radicals which may be attached as represented by $R_1$ and $R_2$ of the general formulas are methyl, ethyl, propyl, isopropyl, butyl, isobutyl, tertiary butyl, etc., vinyl, allyl, crotyl, methallyl, halogenated alkyl radicals as chloromethyl, propyl, isopropyl, butyl, etc., and their homologues and analogues.

The invention claimed is:

1. A process for the separation of hydrogen peroxide from an aqueous mixture containing a substantial amount of hydrogen peroxide and a substantial amount of organic peroxides and resulting from the incomplete oxidation of propane, which comprises heating the mixture at a temperature of from 60° C. to 80° C. for from 15 to 60 minutes to convert the organic peroxides to organic acids, and then subjecting the mixture to distillation under a pressure of from about 35 to about 50 mm. of mercury to separate hydrogen peroxide from the other constituents while maintaining the concentration of water in the mixture containing hydrogen peroxide and organic materials at a minimum of 40 per cent and at not more than about 80 per cent.

2. A process for the separation of hydrogen peroxide from an aqueous mixture containing a substantial amount of hydrogen peroxide and a substantial amount of organic peroxides and resulting from the incomplete oxidation of propane, which comprises heating the mixture in the presence of steam at temperatures of between about 100° C. and 110° C. for from about 1 to about 3 hours to convert the organic peroxides to organic acids, and continuously distilling the mixture to remove organic materials while maintaining the concentration of water in the mixture containing hydrogen peroxide and organic materials at a minimum of 40 per cent and at not more than about 80 per cent.

3. A process for the separation of hydrogen peroxide from an aqueous mixture containing a substantial amount of hydrogen peroxide and a substantial amount of organic peroxides and resulting from the incomplete oxidation of propane, which comprises heating the mixture at a temperature of between about 40° C. and about 120° C. until the organic peroxides are converted to organic acids, and then distilling the mixture to separate hydrogen peroxide from the other constituents while maintaining the concentration of water in the mixture containing hydrogen peroxide and organic materials at a minimum of 40 per cent and at not more than about 80 per cent.

4. A process for the separation of hydrogen peroxide from an aqueous mixture containing a substantial amount of hydrogen peroxide and a substantial amount of organic peroxides and resulting from the incomplete oxidation of propane, which comprises heating the mixture in the presence of steam at temperatures of between about 100° C. and about 120° C. until substantially all of the organic peroxides are converted to organic acids, and continuously subjecting the mixture to distillation to remove organic materials while maintaining the concentration of water in the mixture containing hydrogen peroxide and organic materials at a minimum of 40 per cent and not more than about 80 per cent.

5. A process for the separation of hydrogen peroxide from an aqueous mixture containing hydrogen peroxide and organic peroxides which comprises heating the mixture at a temperature of from 60° C. to 80° C. for from 15 to 60 minutes to convert organic peroxides to organic acids and then subjecting the mixture to distillation under a pressure of from about 35 to about 50 mm. of mercury to separate hydrogen peroxide from the other constituents while maintaining the concentration of water in the mixture containing hydrogen peroxide and organic materials at a minimum of 40 per cent and not more than about 80 per cent.

6. A process for the separation of hydrogen peroxide from an aqueous mixture containing hydrogen peroxide and organic peroxides which comprises heating the mixture in the presence of steam at temperatures of between about 100° C. and 110° C. for from about 1 to about 3 hours to convert the organic peroxides to organic acids and continuously distilling the mixture to remove organic materials while maintaining the concentration of water in the mixture containing hydrogen peroxide and organic materials at a minimum of 40 per cent and at not more than about 80 per cent.

7. A process for the separation of hydrogen peroxide from an aqueous mixture containing hydrogen peroxide and organic peroxides which comprises heating the mixture at a temperature of between about 40° C. and about 120° C. until the organic peroxides are converted to organic acids and then distilling the mixture to separate hydrogen peroxide from the other constituents while maintaining the concentration of water in the mixture containing hydrogen peroxide and organic materials at a minimum of 40 per cent and at not more than about 80 per cent.

8. A process for the separation of hydrogen peroxide from an aqueous mixture containing hydrogen peroxide and organic peroxides which comprises heating the mixture in the presence of steam at temperatures of between about 100° C. and about 120° C. until substantially all of the organic peroxides are converted to organic acids and continuously subjecting the mixture to distillation to remove organic materials while maintaining the concentration of water in the mixture containing hydrogen peroxide and organic materials at a minimum of 40 per cent and at not more than about 80 per cent.

PIETER LEENDERT KOOIJMAN.

REFERENCES CITED

The following references are of record in the file of this patent:

UNITED STATES PATENTS

| Number | Name | Date |
|---|---|---|
| 2,282,184 | Harrower | May 5, 1942 |
| 2,298,064 | McMullin | Oct. 6, 1942 |
| 2,376,257 | Lacomble | May 15, 1945 |